United States Patent [19]

Jorgensen

[11] 4,167,271
[45] Sep. 11, 1979

[54] TRASH BAG HOLDER

[76] Inventor: Anker E. Jorgensen, 12140 NW. Marshall, Portland, Oreg. 97229

[21] Appl. No.: 901,431

[22] Filed: May 1, 1978

[51] Int. Cl.² .............. B62B 1/10; B65D 25/16; B65D 7/04
[52] U.S. Cl. .............. 280/79.1 R; 280/79.2; 220/1 T; 220/69; 220/404
[58] Field of Search ............ 280/79.1 A, 79.2, 79.1 R; 220/1 T, 69, 403, 404

[56] References Cited

U.S. PATENT DOCUMENTS

| | | | |
|---|---|---|---|
| 2,394,319 | 2/1946 | McDonald | 220/69 X |
| 2,740,981 | 4/1956 | Famolare et al. | 280/79.1 X |
| 3,103,083 | 9/1963 | Seeger | 220/319 X |
| 3,370,787 | 2/1968 | Lindholm et al. | 220/404 X |
| 3,734,340 | 5/1973 | Ippolito et al. | 220/404 X |
| 3,777,925 | 12/1973 | Eckholm | 220/404 X |
| 3,818,956 | 6/1974 | Chamberlain | 220/404 X |
| 3,862,595 | 1/1975 | Longo | 220/403 X |
| 3,937,354 | 2/1976 | Clar | 220/403 X |
| 3,963,226 | 6/1976 | Jankowski | 220/69 X |
| 3,997,072 | 12/1976 | Guth | 220/402 X |

Primary Examiner—Allan N. Shoap
Attorney, Agent, or Firm—Kolisch, Hartwell, Dickinson & Stuart

[57] ABSTRACT

A holder for a trash bag, or the like. The holder includes a side support member defining a generally frusto-conical surface which tapers inwardly on progressing upwardly, and a bottom member detachably secured thereto. The trash bag is supported within the holder, with the open end of the bag detachably secured adjacent an upper opening in the side support member. To remove the bag when filled, the side support member is detached from the bottom member and lifted over the bag.

2 Claims, 6 Drawing Figures

U.S. Patent    Sep. 11, 1979    4,167,271
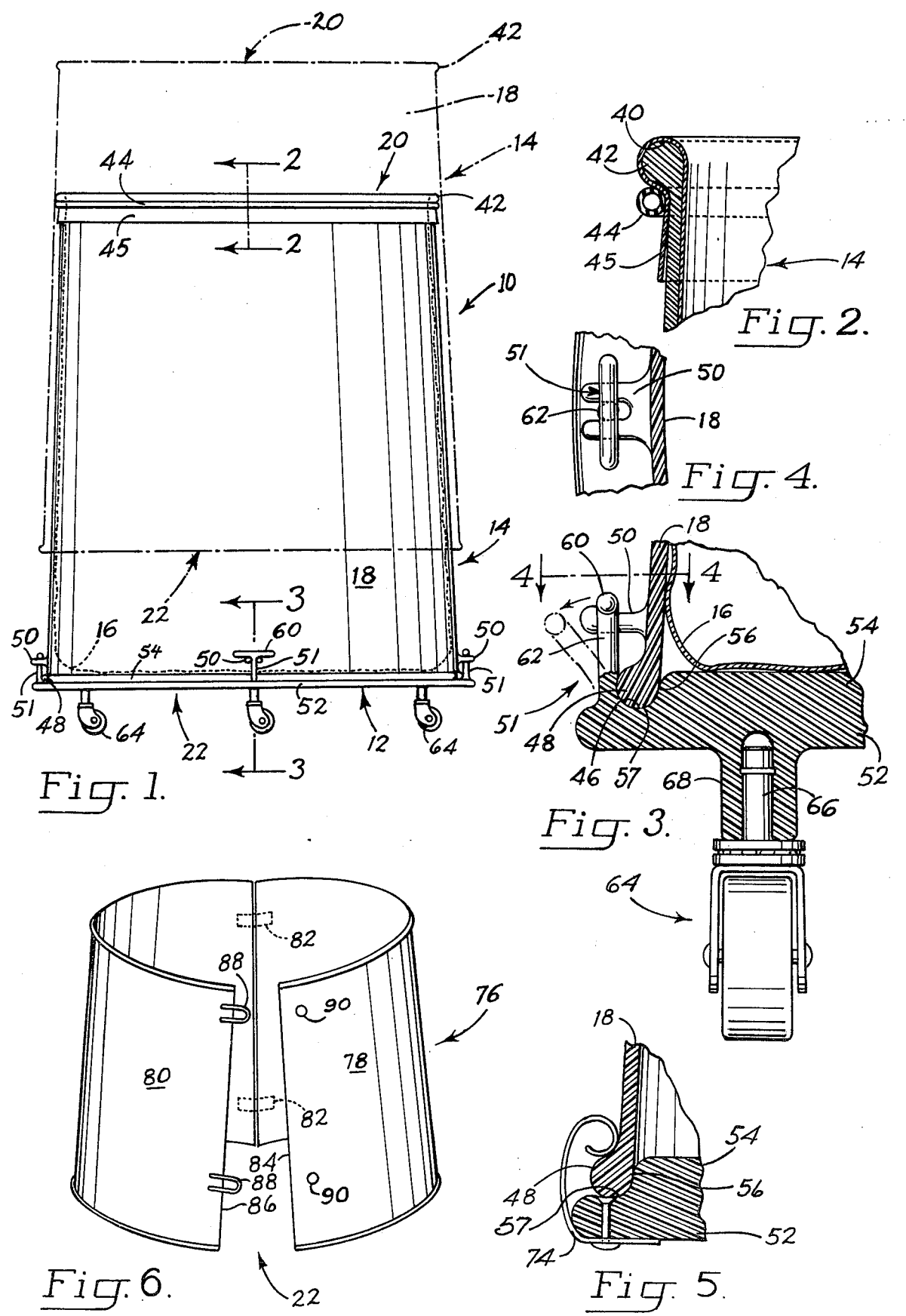

TRASH BAG HOLDER

BACKGROUND AND SUMMARY

The present invention relates to trash bag holders, and in particular, to a holder having separable bottom and side members.

A conventional trash container, or garbage can, is unitary in construction, having a generally tubular side wall ridigly secured to a bottom plate. Such container may be lined with a plastic trash bag supported within the container along the sides and bottom thereof. The open end of the bag may be folded over, or otherwise secured adjacent the upper opening of the container. The liner provides a convenient and sanitary method for storing and unloading trash placed in the container.

One of the problems associated with the above-described container/trash bag arrangement is the tendency of the bag, when filled, to stretch or tear as the bag is removed from the container. This problem results, in part, from the weight of the trash bearing on the unsupported bag as the bag is lifted from the container. Tearing may also result from internal abrasion caused by sharp trash objects such as sticks, bottles, cans, etc. acting through the bag against the side walls of the container, as the trash bag is removed therefrom. It can be appreciated that tearing of a filled trash bag during removal defeats the purpose of the bag.

In the past the problem of tearing and stretching of trash bags have been partially solved by the use of double bags, or reinforced, thicker-walled bags. This solution is not completely satisfactory in that the heavier bags create added expense.

It is an important object of the present invention to provide a trash bag holder which substantially eliminates the problems of bag stretching and tearing that arise in removing a filled bag from the holder.

It is another object of the invention to provide a trash bag holder having interchangeable parts, whereby containers having different desired capacities may be easily constructed.

Yet another object of the invention is to provide a container having a relatively large-area base, whereby the container is less susceptible to tipping over.

It is another object of the invention to provide a trash bag holder which is easily cleaned by virtue of its separable bottom and side support members.

The present invention in trash bag holder comprises a bottom support member having detachably secured thereto a side support member. The latter member is a substantially continuous wall which tapers inwardly upon progressing upwardly and has upper and lower openings defined therein. The lower opening is dimensioned o fit snugly over an annular rim provided on the bottom member. The two members are detachably secured together by interlocking clamps. A trash bag is supported within the holder with its upper edge secured adjacent the upper opening of the side support member by an elastic band. When it is desired to remove a filled trash bag from the holder, the side support member is detached from the bottom member and lifted thereaway.

These and other objects and features of the present invention will now be more fully described with reference to the following detailed description of the invention and the accompanying drawings.

DRAWINGS

FIG. 1 is a side elevation view of a bag holder constructed according to a preferred embodiment of the present invention.

FIG. 2 is an enlarged, fragmentary sectional view taken generally along line 2—2 in FIG. 1.

FIG. 3 is an enlarged, fragmentary sectional view taken generally along line 3—3 in FIG. 1.

FIG. 4 is a fragmentary sectional view taken generally along line 4—4 in FIG. 3

FIG. 5 is a fragmentary, sectional view, similar to the view shown in FIG. 3, illustrating an alternate clamp arrangement securing the side support member to the bottom member.

FIG. 6 is a perspective view of an alternate embodiment of a side support member.

DETAILED DESCRIPTION OF PREFERRED EMBODIMENTS OF THE INVENTION

Referring now to FIG. 1, there is shown generally at 10 a trash bag holder or container constructed according to a preferred embodiment of the invention. Container 10 generally comprises a molded bottom member 12 and a side support member 14 detachably secured thereto, as indicated by solid lines in FIG. 1. The device is dimensioned to support, in a manner to be explained, a trash bag such as a conventional plastic trash bag 16. Though not shown here, device 10 may be provided with a conventional container lid.

In FIG. 1, member 14 is shown in solid line secured to bottom member 12, and in dash-dot line, at a raised position illustrating the removal of member 14 from member 12. Member 14 generally comprises a substantially continuous tubular wall 18 for extending about and supporting the sides of bag 16. Wall 18 tapers inwardly upon progressing upwardly, forming a frusto-conical surface which terminates at opposite ends in upper and lower openings 20, 22, respectively.

With reference to FIGS. 1 and 2, opening 20 is defined by a circular rim 40 which is beaded to form an enlarged rim lip 42. The open end of bag 16 is detachably fastened adjacent the upper opening of member 14 by a garter 44 which encircles, adjacent rim 42, an edge portion of the bag, indicated at 45, which is folded over rim 40. Rim lip 42 and garter 44 thus provide fastening means for detachably fastening the bag, at its open end, adjacent the upper opening of member 14. The circular rim 46 defining lower opening 22 of member 14 is also beaded, as seen best in FIG. 3, forming a lower rim lip 48. Lip 48 is generally rounded and serves to reinforce member 14, with such secured to bottom member 12, in a manner which will be described.

Spaced at 90° intervals about member 14, adjacent opening 22, are four latch-receiving members, such as the three members 50 shown in FIG. 1. As seen in FIG. 4, each member 50 is bifuracted to receive an associated T-latch 51 of base member 12, in a manner to be described.

Referring now to FIGS. 1 and 3, bottom members 12 includes a planar, circular base 52, and a disc 54 disposed above and concentric with base 52, and preferably molded formed integrally therewith. Disc 54 and base 52 form, at the periphery thereof, a shoulder having an annular outwardly facing surface 56 and an annular upwardly facing surface 57, together defining what is referred to herein as edge surface means. Annular surface 56 is dimensioned to engage an interior surface portion of side member 14 adjacent opening 22. Attached to the upper surface of base 10, radially outwardly of edge 56, at positions alignable with latch-receiving member 50, are four flexible T-latches 51, such as the three latches shown in FIG. 1. Each latch includes a handle 60 attached to base 52 by a flexible stem 62. Attached to the lower surface of base 52, and spaced thereon to provide a stable rolling support for holder 10 are a plurality of casters 64. With reference to FIG. 3, these casters are secured to base 52 by caster pins 66 held within suitably dimensioned caster sockets 68 formed integrally with base 52.

To secure member 14 to member 12, member 14 is positioned to bring into vertical alignment members 50 and latches 51. Member 14 is then pressed downwardly to engage an annular interior surface portion of member 14 adjacent opening 22 firmly against edge surface 56 of the base member. As can be appreciated from FIG. 3, disc 54 thus serves to position member 14 concentrically on member 12, and form a sealed annular region therebetween. With the two members so positioned, latches 51 are then engaged with the associated latch-receiving members 50, as shown in FIGS. 3 and 4. Latch-receiving members 50, and associated latches 51 thus form means for detachably securing the side support member, adjacent its lower opening, on the bottom member. It can be appreciated from FIG. 3 that beaded rim 48, held between surface 56 and stem 60, reinforces the rim of opening 22 against inwardly and downwardly directed forces acting on such rim with member 14 so attached to member 12.

Shown fragmentarily in FIG. 5 are portions of members 12, 14 carrying thereon alternate mounting means for detachably securing member 14 to member 12. Here curved spring members, such as member 74, are secured to marginal edges of base 52 and are spaced radially outwardly from disc 54. The spring steel members are operable to engage rim 48 to releasably hold the side support member on the bottom support member. It can be appreciated with reference to FIG. 5, that when wall 18 of support member 14 is forcibly moved toward base 52 of bottom member 12, to attach the two members, lower rounded portions of rim 48 engage upper rounded portions of spring members 74, forcing the latter outwardly, permitting the rim to be moved downwardly to seat snugly against the bottom member, as shown in the figure. Upon such seating occurring, the rounded end portions of spring members 74 press firmly against upper portions of rim 48 to releasably secure member 14 to member 12. Similarly, when member 14 is forcibly pulled away from member 12, spring members 74 are moved yieldably outwardly to allow detachment of the two members.

Shown at 76 in FIG. 6 is an alternate embodiment of a side member adapted for use in the present invention. Member 76 is constructed from a pair of mirror image wall segments 78, 80 which are pivotally connected along one pair of their adjoining side edges by hinges 82. The separable pair of side edges 84, 86 may be securely fastened together by conventional fastening means such as the elastic straps 88 on segment 80 which are fastenable about strap hooks 90 on segment 78. It can be appreciated that the two segments, so fastened, form a substantially continuous wall defining a frustoconical surface wich terminate at opposed ends in circular upper and lower openings 20, 22. Other features of member 76 ae identical to features described with reference to member 14.

Describing the operation of the invention and referring to FIG. 1, bag 16 is placed in holder 10 with the bottom of the bag supported on disc 54, and the open upper edge of the bag folded over upper opening rim 40. The open end of the bag is secured to the holder in the manner described above. When the bag has been filled, and it is desired to remove the bag from the holder, garter 44 is removed and the bag closed at the top by conventional means. The mounting means detachably mounting members 12, 14 are released, as described above, permitting member 14 to be lifted from member 12 over bag 16, as indicated by the dash-dot line in FIG. 1. With member 14 so removed, filled trash bag 16 is now supported solely on member 12 and is easily accessible for removal therefrom. Bag 16 may thus be removed from holder 10 without having to lift the bag unsupported at its bottom. The possibility of tearing or stretching the bag is thereby reduced. Further, by the inwardly-tapered construction of member 14, this member may be lifted off of bag 16 with a minimum of contact between the sides of the bag and the interior surface of the member. Explaining further, as member 14 is lifted off of the filled trash bag, the sides of the bag contact interior wall portions of increasing diameter.

As explained above, member 76 may be used interchangeably with member 14, in constructing holder 10. In this regard, it is noted that a variety of sizes of side support members may be secured to base 12 to form holders of desired capacities. With segments 78, 80 rigidly secured to one another, in the manner described above, member 76 functions identically to member 14. To remove member 76 from the holder having a filled trash bag therein, member 76 is released from base 12, in the manner described above, and further removed from the bag by unhooking straps 88 to permit segments 78, 80 to hingeably swing away from the sides of the bag. By this action, damage to the bag during removal of member 76 is minimized.

In addition to those advantages discuss above, it is noted that the generally upwardly tapered construction of holder 10 gives the holder greater stability against tipping. Further, existing cans into which bags are placed often have sharp edges that will tear the bag as it is lifted from the can. This does not occur in the present device.

There has thus been disclosed a novel trash bag holder having a seaparable base and side member construction which allows removal of a filled trash bag from the holder with minimum stretching and tearing damage to the bag. Various changes and modifications of the above-described device may be made without departing from the spirit of the invention, as embodied in the following claims.

It is claimed and desired to secure by Letters Patent:
1. A trash bag holder comprising:
   a side support member defining a substantially continuous tubular wall for extending about and supporting the sides of a bag, said support member having upper and lower openings defined therein,
   a rounded rim formed on said support member, adjacent said lower opening,
   a molded bottom member including edge surface means integrally formed therein and positioned to engage edge and interior surface portions of said support member adjacent said lower opening to inhibit lateral shifting of said side support member relative to said bottom member, said means defining a shoulder having an annular outwardly facing surface and an annular upwardly facing surface for engaging said surface portions, and a plurality of yieldable spring members mounted on said bottom member adjacent but spaced radially outwardly from said edge surface means, said spring members comprising fastening means for yieldably engaging and disengaging portions of said rim when said support member is forcibly moved onto and away from said bottom member, respectively, engagement of said spring members with the rim portions serving to releasably secure said surface portions between said spring members and said edge surface means.

2. The holder of claim 1 wherein said bottom member has formed integrally therewith, on a side opposite said edge surface, a plurality of sockets for attachably receiving the mounting pins of caster wheel assemblies.

* * * * *